United States Patent [19]
Vaeth et al.

[11] Patent Number: 6,035,402
[45] Date of Patent: Mar. 7, 2000

[54] VIRTUAL CERTIFICATE AUTHORITY

[75] Inventors: J. Stuart Vaeth, Winchester; Charles S. Walton, Wellesley, both of Mass.

[73] Assignee: GTE CyberTrust Solutions Incorporated, Needham, Mass.

[21] Appl. No.: 08/770,824

[22] Filed: Dec. 20, 1996

[51] Int. Cl.[7] .................................................. H04L 9/00
[52] U.S. Cl. ............................................ 713/201; 280/23
[58] Field of Search .......................... 713/200, 201–202; 709/225, 229; 707/9; 380/21, 23–25

[56] References Cited

U.S. PATENT DOCUMENTS

| | | | |
|---|---|---|---|
| 5,214,702 | 5/1993 | Fischer | 380/30 |
| 5,455,953 | 10/1995 | Russell | 395/739 |
| 5,481,720 | 1/1996 | Loucks et al. | 395/700 |
| 5,590,199 | 12/1996 | Krajewski, Jr. et al. | 380/25 |
| 5,684,951 | 11/1997 | Goldman et al. | 395/188.01 |
| 5,717,757 | 2/1998 | Micali | 380/25 |
| 5,745,574 | 4/1998 | Muftic | 380/23 |
| 5,774,552 | 6/1998 | Grimmer | 380/25 |
| 5,790,785 | 8/1998 | Klug et al. | 395/188.01 |
| 5,825,300 | 10/1998 | Bathrick et al | 340/825.33 |
| 5,864,620 | 1/1999 | Pettitt | 380/4 |
| 5,878,144 | 3/1999 | Aucsmith et al. | 380/30 |

OTHER PUBLICATIONS

ANSI X9.57 Draft: Public Key Cryptography for the Finan-cial Services Industry, Certificate Management (cover page and p. 49 only).

Carty, Tom, "Electronic Commerce and The Certification Authority", FSTC Financial Services Technical Consortium, Electronic Commerce Conference–New Orleans, LA–pre-sentation slides–www.cybertrust.gte.com, Oct. 1996.

Carty, Tom, "Electronic Commerce; Security in Electronic Payments", Cyberpayments@Tokyo–Tokyo, Japan–presen-tation slides–www.cybertrust.gte.com, Nov. 1996.

Carty, Tom, "Securing the Information Industry: The Role of the Certification Authority", UBS Investors Conference–NY, NY–presentaiton slides–www.cybertrust.gte.com, Dec. 1996.

Carty, Tom, "Electronic Commerce and The Certification Authority ", 12th Annual Computer Security Applications Conference–San Diego, CA–presentation slides–www.cy-bertrust.gte.com, Dec. 1996.

Carty, Tom, "Smart Cards and Security", Federation of Government Information Processing Councils–Vail, CO–presentation slides, www.cybertrust.gte.com, May 1996.

Carty, Tom, "Electronic Commerce–SET", Mastercard International–Purchase, NY–presentation slides, www.cy-bertrust.gte.com, Aug. 1996.

Carty, Tom, "The Advent of Digital Certificates: Fulfilling the Promise of Secure Electronic Commerce", EDI World Elec Comm World, Sep. 1996.

Carty, Tom , "Security and Electronic Commerce: A Virtual Barrier", Electronic Commerce Conference–Columbus, OH–presentaiton slides–www. cybertrust.gte.com, Sep. 1996.

*Primary Examiner*—Ly V. Hua
*Assistant Examiner*—Scott T. Baderman
*Attorney, Agent, or Firm*—Leonard Charles Suchyta

[57] ABSTRACT

A method and system for creating and administering cer-tificates digitally signed by a trusted entity (certificate authority) to ensure that certificated transactions are authen-ticated as that of a particular entity. Requests for a certificate, along with verification information, are directed to the certificate authority, where they are held and accessed by an entity having verification responsibilities (registration authority) and approved or disapproved.

6 Claims, 6 Drawing Sheets

VIRTUAL CERTIFICATE AUTHORITY

FIELD OF THE INVENTION

The present invention relates generally to the field of secure telecommunications, and, more specifically, the issuance and management of "certificates" in such telecommunications, particularly in electronic commerce.

BACKGROUND OF THE INVENTION

Herein, "network" refers to any electronic communications network, including but not limited to the Internet, "Intranets", various wide area networks (WANs) and local area networks (LANs), connecting computer systems or "nodes", sometimes referred to here as a "computer". In addition, herein, "transactions" refer broadly to any transfer of information between any nodes of the network, including transfers of "data", "records" or other information, typically referring to what is apparent to a user at higher layer of network communication. These transactions may take place between virtually any entities each associated with one or more network nodes and may be used in a variety of applications such as electronic data interchange (EDI), electronic commerce, financial information and trading, health and governmental records and filing, and legal communications.

"Certificate" is herein defined as information issued by a "certificate authority", an entity generally holding a position of trust within the scope of application to which the certificate is relevant, to authenticate or certify that a transaction is associated with a particular entity. Particular types of certificates for which the invention may be used are described generally in draft ANSI X9.57, "Public Key Cryptography for the Financial Services Industry, Certificate Management", available from the American Bankers Association.

The Internet network provides connection among a large and growing number of entities including vendors of goods and services and their potential customers. Incentives to conduct business over the network are many and compelling, for example, the reduction or elimination of the need for physical travel, samples, and sales personnel in the selling process and the centralized provision of the latest product or services descriptions and terms, allowing inexpensive, uniform and timely updates at the point of sale. Using the Internet, small businesses can communicate with an audience of customers far beyond that previously available to them. For these and many other reasons, business is being conducted in increasingly large volumes over the Internet and other networks.

However, there are limitations and problems associated with sales and other transactions over the network. One fundamental concern is how to verify the identity of a party to a transaction (and whether that party is trustworthy), particularly in a transaction that results in the transfer of value to that party. In typical consumer credit card transactions for purchase of goods by mail order or telephone order, some of the risk is limited by allowing delivery of goods only to a physical address that has some associated trustworthiness (an owned home, as opposed to a post office box). This safeguard is absent where valuable information, such as software or proprietary databases, is made available on a network to the general public and may be downloaded anonymously. Even in the case of physical delivery, there is still the possibility that the addressee party may repudiate the transaction.

A general approach to assuring the identity of parties to a transaction and providing a basis for non-repudiation of a transaction in a network environment is the employment therein of a certification procedure in a "public key infrastructure" such as that exemplified in the draft X9.57 standard. This approach is built upon a public/private key or "asymmetric" encryption/decryption scheme defined, for example, in the ANSI X9.30 series of specifications covering "the Digital Signature Algorithm", available from the American Bankers Association.

General asymmetric or "public key" encryption/decryption mechanisms are well known in the art, such as those invented by Rivest, Shamir and Adleman ("RSA"). The concept is based upon the existence of algorithms that allow encryption/decryption using related "keys" that are associated with each other, but one of which, the "private" key, is extremely difficult to derive from the other, "public" key.

In one type of asymmetrically coded or encrypted communication, the message is encrypted using the public key, made available to any number of senders for use in such encryption, and only one recipient of the encrypted message may decipher the communication—the sole holder of the private key. This assures that there is only one recipient of decoded or deciphered information encrypted with the public key.

In another type of asymmetrically coded communication, the communication is encrypted using the private key, held only by one sender, and any number of recipients of the encrypted communication may decipher the communication using the public key made available to them. This assures that there is only one sender of information encrypted with the private key that is decipherable with a given public key and thus allows recipients to uniquely associate that sender with that public key. By applying this type of encryption to a shortened, unique representation of a communication generated by a "hash function", a "digital signature" can be generated that authenticates to holders of the public key that the sender/encoder of the communication is the holder of the associated private key.

Figure 1:
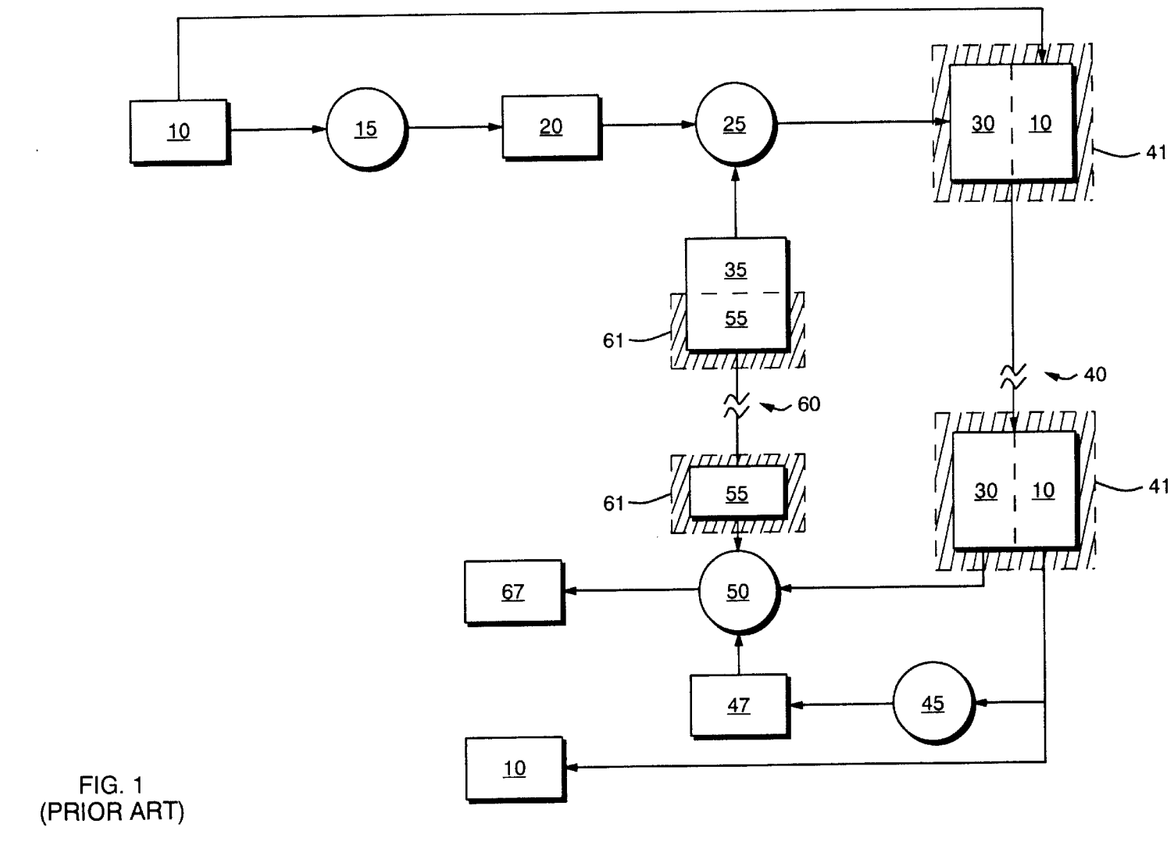
FIG. 1 is a block functional and data flow diagram for a prior art transaction using public key encryption which may be supported by a certificate generated using the present invention.

The communication of a digitally signed message according to this approach is shown in FIG. 1. A message 10 is uniquely represented by a "hash value" or hash result 20 using a hash function 15, which may be a one-way hash function so that it is computationally infeasible to derive the original message from knowledge of the hash value. The hash result 20 is then encoded using the message sender's private key 35 in a signing function 25 to result in a digital signature 30 that is stored or transmitted with the original message 10. The process of transmission 40 may be by direct link or communication over a network and may itself involve encryption and decryption of the entire package. (One approach is to generate a random symmetric key using the Digital Encryption Standard DES, encrypt the entire package using that key, encrypt the symmetric key using the recipient's public key to create a "digital envelope" 41, and send the encrypted package with the digital envelope to the recipient.)

When the message 10 and its digital signature 30 are received (and decrypted) or retrieved, the message to is subjected to the hash function 45 (identical to hash function 15) to generate a new hash result 47. This is compared in the verification function 50 with the digital signature 30 as decoded using the public key 55 associated with the private key 35 (and previously sent on 60 or simultaneously sent on 40, possibly encrypted in a digital envelope 61), resulting in verification 67. This process assures that the message 10 was signed at 25 using the private key 35 associated with the public key 55 and that the message 10 was unaltered (otherwise the hash results would not match). The process thereby authenticates that message 10 was signed by the holder of private key 35 associated with public key 55 and thereby provides evidence against any repudiation by the private key holder that it signed message 10.

The scheme shown in FIG. 1, however, merely assures that message 10 is signed at 25 with the holder of the private key 35 associated with public key 55. There is no assurance provided in this framework that the holder of the private key/public key pair is who the recipient of verification 67 believes the holder to be. An impostor could send his own public key over communication link 60 and sign his own message with his corresponding private key. This possibility of fraud may be multiplied extensively in the relatively anonymous "cyberspace" of those connected to the Internet and has been viewed as an obstacle to commerce on the Internet.

The problem of verifying that signatures are authorized and authentic in the electronic communication context has been addressed, for example, in ANSI X9.57, with the use of "certificate authorities" (CAs). The CA acts as a digital analogue to a notary public—to certify that a digital signature in fact belongs to the entity identified in the certificate, according to criteria that would allow the use of that signature in the relevant application (such as credit card purchases over the Internet).

Typically, the CA provides a certificate including (a) information identifying the certified party, (b) the certified party's public key, and (c) information identifying the CA, digitally signed, that is, encrypted with the CA's private key. (The particular form of a certificate has been prescribed in a number of industry specifications, such as ITU Rec. X.509 (1993)ISO/IEC 9594-48: 1995.) The certified party can send such a certificate, for example, on medium 60, to any recipient who may decrypt the certificate using the CA's public key and extract the certified party's public key and thus have the CA's assurance that the certified party is as identified in the certificate.

Because the recipient can only be as assured as the recipient trusts the CA's signature on the certificate, the CA's signature in some applications will itself be certified by a higher level CA. The higher level signatures are copied onto each lower level certificate. In this way, layers of CA signatures are stored or written on certificates for lower level CAs. The path or "chain of trust" of signatures CAs that are stored on the certificate can be reviewed by the recipient of the certificate using the public keys provided with the certificate. At the highest level, there will be a "root CA", whose authority is trusted by the recipient. The root CA's public key is initially distributed in a trusted fashion generally "off-line", such as by face-to-face interaction or included in encryption software, and may be updated later using public key encryption.

The CA functions include (a) verification or qualification of identity—that a digital signature (public key) presented to it in fact belongs to the entity identified with the presentation—and (b) the issuance of a certificate under the CA's own digital signature. As in the case of a notary, the CA most likely does not have actual knowledge that a presented signature belongs to a particular entity, but relies on other tests to make such a determination.

In early models, CAs could have a "registration authority" (RA) function, for example, registering who within an organization was authorized with signing privileges relative to a certain level of transaction activity. A current application involves registering credit card holders with the CA so that the CA can later issue certificates to holders upon comparison and verification of data submitted with a certificate request against data previously registered. Alternatively, a CA that is not itself a credit card issuer and does not perform the registration function may have a secure communication link to access a credit card issuer's database in order to access registration data collected by the issuer. In each of these cases, the CA performs the identity verification function, albeit using the registration database.

Where the registration database has been created and historically maintained and used independently of the use of a CA, for example, a credit card issuer's databases of credit card holders and merchants, the maintainer of the database likely has more experience with for verification of the identity of the party. The database maintainer may have personnel trained to do the verification possibly in conjunction with proprietary statistical procedures. This suggests the possibility of separating the identity verification function from other CA functions.

Figure 2:
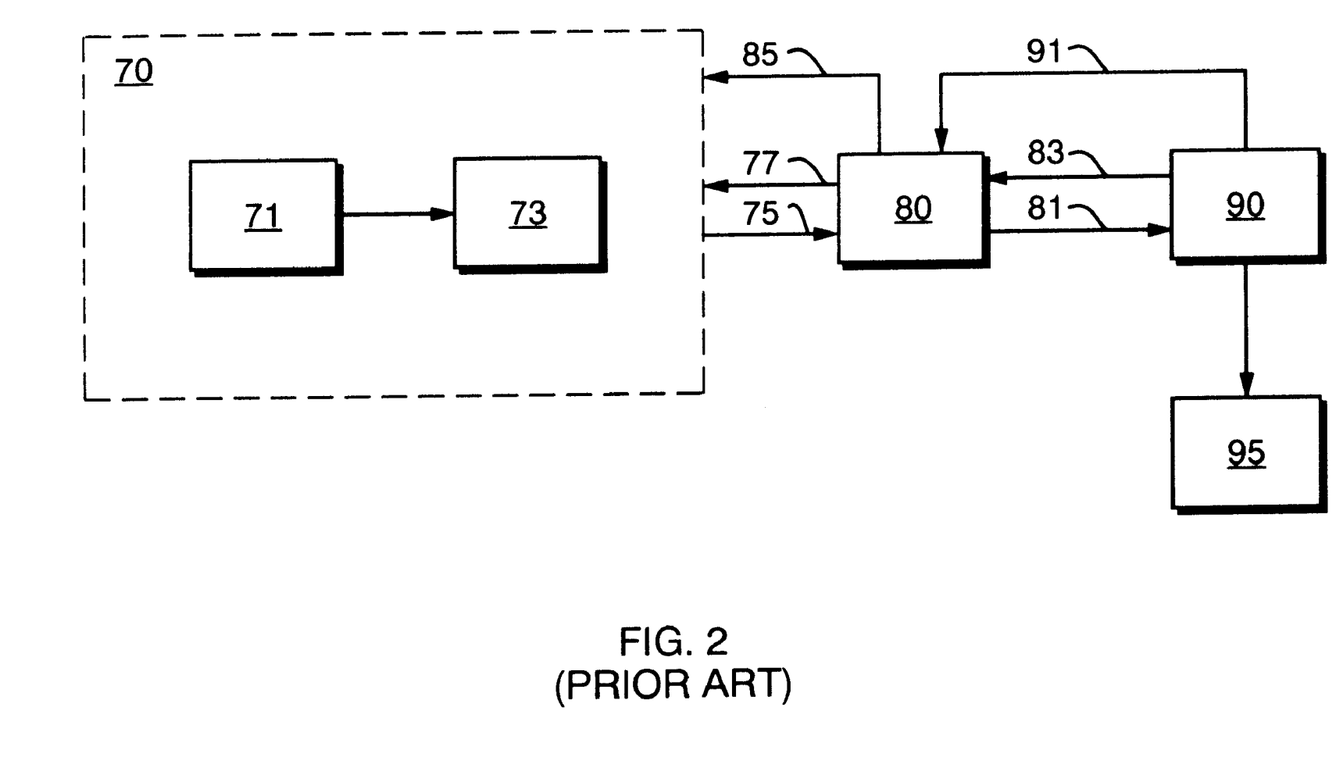
FIG. 2 is a block functional and data flow diagram for a prior art system for certificate issuance using a local registration authority.

ANSI X9.57 discloses the concept of a separate "Local Registration Authority" (LRA) interposed between the CA and the certificate requester that is an entity appointed by a CA to assist in applying for certificates. This scheme is shown in FIG. 2 as the prior art.

Requester 70 employs a public/private key pair generator 71 to generate the key pair, then prepares a certificate request data (CRD) submission 73, signed with the requester's private key, and sends it to the LRA 80 using secure means 75. The LRA 80 then verifies the identity of the requester according to the policy of the CA, which may include, for example, questions currently used to verify the identity of credit card number holders. LRA 80 then accepts CRD 73, checks it for errors or omissions and verifies the requester's signature, submitting it to CA 90 in a message signed by LRA 80 using secure means 81. CA 90 validates the request for a certificate, then prepares the certificate information, signs it with the CA's private key and distributes the certificate to subscribers 95 (if authorized) and back to the LRA 80 using secure means 83, with an "out-of-band" notification on channel 91. LRA 80 in turn receives the certificate creation confirmation and certificate from the CA 90 and verifies the CA's signature. LRA 80 then delivers a copy of the CA's public key and a copy of the certificate (signed by the CA) to the requester using secure means 77 with an out-of-band notification on channel 85. The public key of the LRA may be distributed to the requester in a similar manner as described about for the public key of the CA in certification without an LRA.

The LRA scheme described above allows for a requester database to be held securely at the LRA location and to divide responsibility for the functions of verifying the identity of the requester and issuing the certificate. However, the LRA approach requires the LRA to be an intermediary twice in a chain of secure communications links from the requester to the LRA to the CA back to the LRA and back to the requester, putting burdens on the LRA to provide for hardware, software, personnel and procedures to assure that each link with associated keys is secure. Where continuous access is an issue, such as in global credit card transactions, investment in redundancy would also be required at the LRA facility, which serves as the gateway to the CA. These infrastructure burdens are not warranted, for example, in the case of corporate authorizations (as in the original RA function) of corporate card holders.

Generally, the maintainer of a customer database has protected the integrity and confidentiality of that database and information contained therein by maintaining it in a secure physical plant with operational safeguards. For typical credit card authorizations or qualifications outside the CA context, electronic access to the database is limited to an operator intermediary's on-site or dedicated secure line access on a file-by-file basis. This minimizes the possibility of larger-scale compromise of the database.

The function of issuance of digital certificates, on the other hand, requires direct electronic access or link of the requester to the issuer under conditions that assure the integrity of the delivery of the digital certificate. In the context of a large marketplace, there may be many requesters, such as credit card holders and merchants, and there are many links, further multiplied by intermediary links on a "public" network, such as the Internet or a telecommunication network operated by a common carrier. Direct access through each of these links increases the possibility of attack over the network that could compromise crucial components of the issuer, namely, its private keys and certificates of its own signature. Protection of these crucial components in the network environment, compared to protection of a limited-access requester database, calls for a substantially different investment in hardware and software (for example, effective "firewalls" against network attack) and in secured physical plants and procedures for professional and support personnel for protecting relatively few, but critically important, encryption components.

It is an object of the present invention to provide a system for qualifying requests for and issuing certificates that may be used to authenticate electronic transactions.

It is another object of the present invention to separate the functions of qualifying requests for and issuing such certificates so that the functions can be provided separately using existing hardware, software, personnel and procedural infrastructures with a minimum of new investment and maximum cost-effectiveness of new investments in such infrastructures.

It is yet another object of the present invention to provide means whereby an owner of a confidential registration database can perform the qualification function while maximizing security for that confidential database using existing infrastructure.

Another object of the present invention is to provide a system in which new investments in security infrastructure are concentrated in the entity having the function of issuing such certificates so that different entities may separately perform the qualification function using different criteria and different registration databases, but utilize the infrastructure investment in the entity having the issuance function.

Another object of the present invention is to provide a system that flexibly accommodates a wide range of applications and secure communications means.

Yet another object of the present invention is to provide a system in which a database owner may appear to a certificate requester to be a CA without investment of the database owner in issuance infrastructure.

SUMMARY OF THE INVENTION

The above objects above are met by the present invention which encompasses a method of and apparatus or system for providing certificates to requesters in which (1) the requesters send their requests and verification data to the CA, (2) the RA accesses the requests and verification data held at the CA and performs the identity verification function at the RA, and (3) upon approval of the RA, the CA performs the certificate issuance function. With only investment in a network browser with secure session capability to access securely the certificate requests and communicate securely approval to a certificate issuer, an RA entity can act as a "virtual CA".

More specifically, a preferred embodiment of this invention provides a method of certifying a transaction including the steps of (1) requesters (a) requesting certification on a network from a "web site" (like the "World Wide Web" of logically linked Internet nodes) of the CA reached with a network browser, and (b) providing information including verification or qualification data and the requester's public key; (2) the RA (a) accessing the certificate request information via the network, (b) approving the request, and (c) sending the approval to the CA via the network; and (3) the CA (a) generating the certificate with the requester's public key and the public key of the certificate authority, (b) signing the certificate using the private key of the certificate authority; and (c) delivering the certificate to the requester on the network.

In another preferred embodiment of this invention the requester may access via a network a web site of the RA. The web page at this site associated with a certificate request may be linked (for example, hyper linked) to a CA web site where the request information, as described above, is transferred. In both processes the requester need not know that the CA has taken over the management of the request.

Another preferred embodiment of this invention includes a hardware system that performs the above methods, particularly that implemented at the CA. The system includes computer servers that allow secure access to and from the network. Also, a processor firewall is provided to prevent damage to the system emanating from the network, such as by unauthorized access; a web-server processor is provided that handles requests and sends those request to the CA's on-line server; and cryptographic cards ("crypto cards") for crucial encryption elements such as the creation and storage of the CA's private keys and the storage of the CA's certificates signed by higher level CAs. Card readers, memory for information storage, operator consoles, modems and the like, including interfaces for high speed lines, e.g., T1 and/or T3 lines may be used with high speed communications to lessen the time for the transactions to be accomplished. The hardware also includes components to allow for "off-line" CA services such as root CA services, which are electronically isolated from the network.

Specific hardware and software are discussed in the preferred embodiments section herein.

An advantage of the present invention is that the CA may generate and host an Internet (or Intranet) web site on behalf of multiple RAs or have certificate requests to an RA-maintained web site linked invisibly to the CA to provide a "virtual CA". The network linking provides flexibility as to different applications and RA requirements. The distributed functionality minimizes RA investment and allows the CA to concentrate on providing security at the most security-sensitive portion of the system.

Other objects, features and advantages will be apparent from the following detailed description of preferred embodiments thereof taken in conjunction with the accompanying drawings in which:

DETAILED DESCRIPTION OF PREFERRED EMBODIMENTS

To understand the present invention, the following information is presented.

Figure 3:
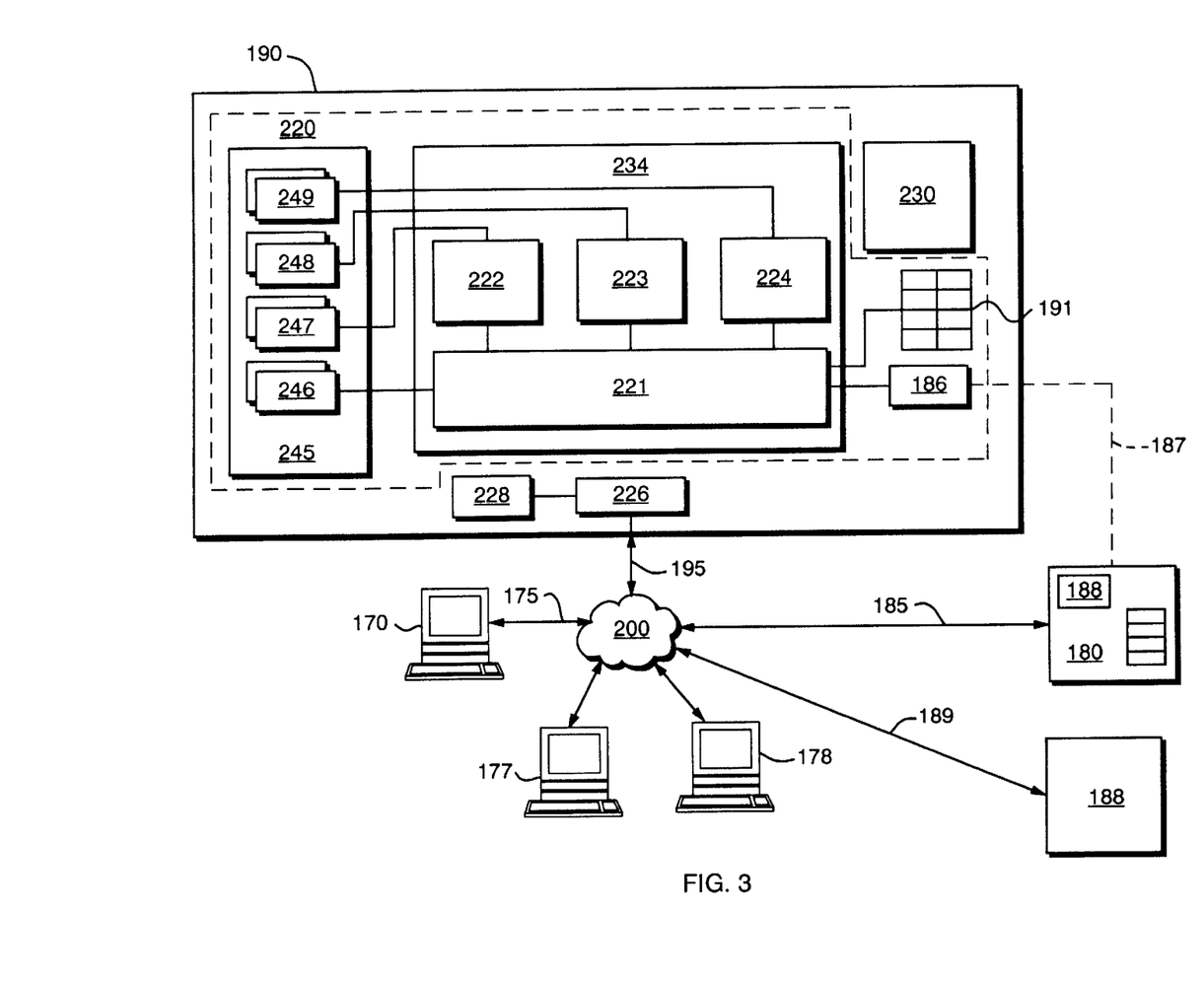
FIG. 3 is a block system diagram of a preferred embodiment of the invention.

FIG. 3 is a block system diagram showing CA facility 190 with on-line computer system 220 connected to the Internet 200 by link 195, which may be a T1 or T3 line. A "firewall" system 226 and web-server 228 is included in the preferred embodiment. RA computer or computer system 180, which may be associated with a credit card issuer, is connected to Internet 200 by link 185 and optionally, by dedicated link 187 to CA 190. RA computer or computer system 188, which may be associated with a corporate account authorization office, is connected to Internet 200 by link 189. Requester or user computer 170, which may be a credit card holder's or other user's computer, is connected to Internet 200 by link 175. Node 177 may be a merchant's computer and node 178 may be a payment gateway computer.

Figure 4:
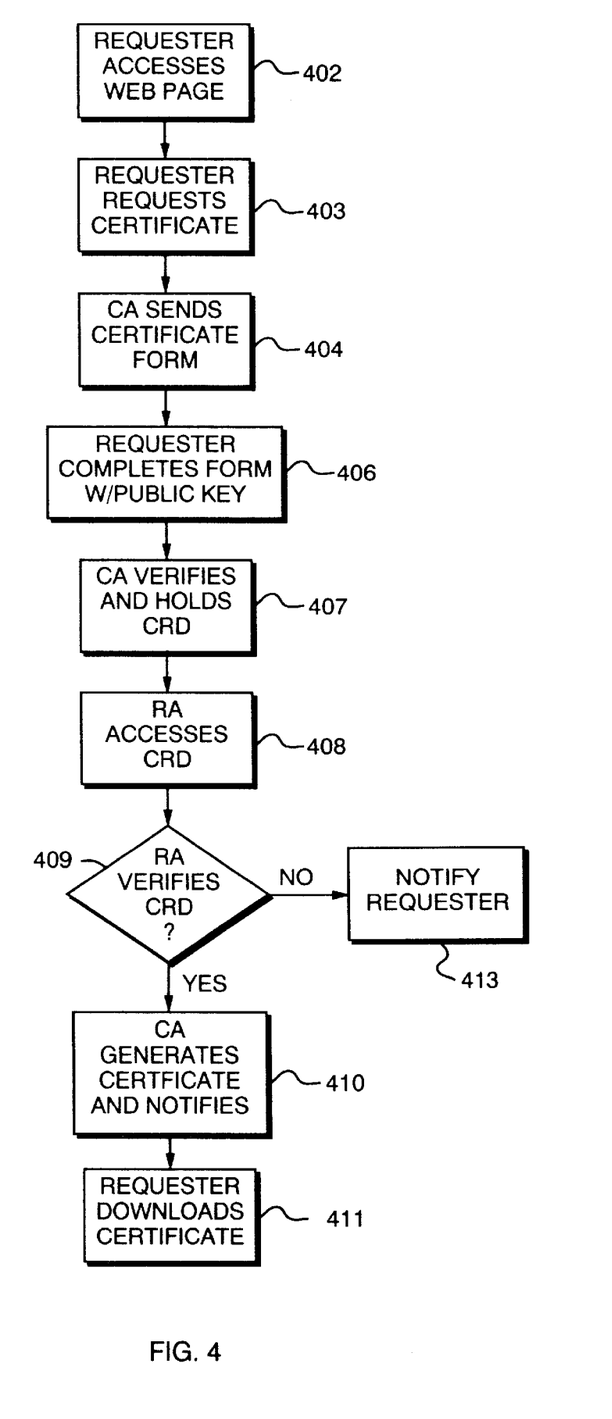
FIG. 4 is a block procedural flow diagram of a preferred embodiment of the invention

FIG. 4 is a block procedural flow diagram for certificate issuance in the above system for user 170. A similar procedure could be used for different types of certificates for merchant 177 or payment gateway 178. Within the preferred embodiment of the on-line CA system 220, the procedures are implemented in software through generic certificate request server application functions 221 and specialized functions, for example, for cardholders 222, merchants 223, and payment gateways 224. Each set of functions may have associated "crypto cards" 246, 247, 248, and 249, respectively, inserted in card reader 245, which perform the cryptographic aspects of their respective functions, including the generation of the particular type of certificate, which in turn includes the encryption of the digital signature of the "virtual CA" relative to that type of certificate.

As a first access step 402, requester 170, using an Internet browser (which may also be used on an Intranet), gains access to a certificate request web page (not shown), a page at the web site of CA 190, set up on behalf of RA 180. A login ID and password may be configured with this page to minimize misuse of curious network users. Communication over links 175 and 195 and through Internet 200 may be encrypted using secure communication features available in current browsers, such as SSL from Netscape Communications, Inc., and PCT from Microsoft Corp., implemented at the transport layer of communication with random symmetric keys for the session. In another preferred embodiment, requester 170 accesses a web page at a site maintained by the RA 180, and a link (HTTP or "hyper link") then sends the requester to the certificate request page at the CA-maintained site. In both cases, the actual CA may be invisible to the requester, and RA 180 acts as a "virtual" CA.

In selection step 403, requester 170 selects the option to request a certificate. CA response 404 presents the requester with a Hyper Text Mark Up language (HTML) form to complete with information for verification against registration data held at RA registration database 181. The information required on the certification request data form is determined by RA 180 as the "virtual" CA, but the form is held at and distributed from CA facility 190.

In request step 406, requester 170 completes the request form, adds his public key (generated along with a private key), and sends this certificate request and data (CRD) to CA 190, generally in a digital envelope. After appropriate decryption and validation for conformance with formalities, the CRD is stored at the CA facility 190 (in the preferred embodiment, a Redundant Array of Independent Disks or RAID). The requester's request is then acknowledged, and the status and approximate time for the approval or disapproval is sent to the requester at step 407.

In RA link step 408, RA 180 accesses periodically and stores at 182 the CRD via network 200 using a path including links 195 and 185, which may be secured by special personal identification numbers (PINs) and/or other special hardware and/or software. In a preferred embodiment, the RA establishes contact using an Internet browser and is identified and authenticated using a user name registered at the RA and a response code stored in a hardware token such as a SecurID card. Other means of securing the link include the RA's use of a crypto card issued by the CA and the RA's presentation of its own certificate. In an alternative embodiment, appropriate for a card issuer RA, a separate dedicated secure link 187 may be provided with link encryptor 186, for communication between RA 180 and CA 190. In yet another alternative embodiment, the CA 190 may notify appropriate RAs of its receipt of a CRD.

In verification step 409, which may be performed on a batch basis, RA 180 compares the CRD data with the data in its registration database 189 and approves or disapproves the certificate request. In notification step 410, RA 180's approval or disapproval is sent to CA 190. If approved, CA 190 takes steps 410 by generating and signing the certificate (in the preferred embodiment using card holder certification software/hardware functions 222 and crypto card 247), storing the certificate at 191, and notifying requester 170 of the availability of the certificate, for example, by e-mail over network 200. In step 411, the requester returns to the CA web page and downloads its certificate. If disapproved, that disapproval is sent to requester directly or indirectly in step 413.

As can be seen from the distributed nature of the invention, a different RA 188, for example, one charged with responsibility over corporate charge accounts ("a corporate RA") or with regional responsibility, may access and approve the same CRD, subject to screening by the CA 190. Thus, an alternative approval scheme (approval by RA 180 or RA 188) or a joint approval scheme (approval by RA and approval by RA 188) may be implemented with appropriate screening by CA 190, with many combinations possible with additional RAs enabled with network browsers and programming at CA 190.

Also as a part of the distributed nature of the invention, substantially all of the same hardware at CA facility 190 supports multiple "virtual CA" functions. Thus, in addition to the example discussed for issuance of a credit card holder certificate for user 170, using software/hardware functions 222 and crypto card 247, essentially the same procedure and hardware may be applied for issuance of a merchant certificate for merchant 177 using software/hardware functions 223 and crypto card 248 and for issuance of a payment gateway certificate for payment gateway 178 using software/hardware functions 224 and crypto card 249. (In an alternate embodiment not relying upon the use of crypto cards, all the hardware can be the same.) Each of the approvals for these three different types of certificates might be performed by the same RA 180, for example the credit card issuer, acting as a different "virtual CA" (using a different crypto card) for each type of certificate. The same CA 190, with software modification of some of its screening functions, can support a different brand of credit card with a different RA acting as a different "virtual CA" using a different crypto card.

In the preferred embodiment, as shown in FIG. 3, CA physical facility 190 provides an on-line CA system 220 to respond to authorized communications from the network 200 via a firewall workstation 226 that protects against catastrophic or other such failures or occurrences, as well as attacks on security, that may affect the integrity of the CA system. A web-server workstation 228 controls the interactions via the firewall system and sends requests that need further handling to the on-line CA 220. An off-line root CA system 230 is provided to generate and validate the on-line CA system 220, if required.

Figure 5:
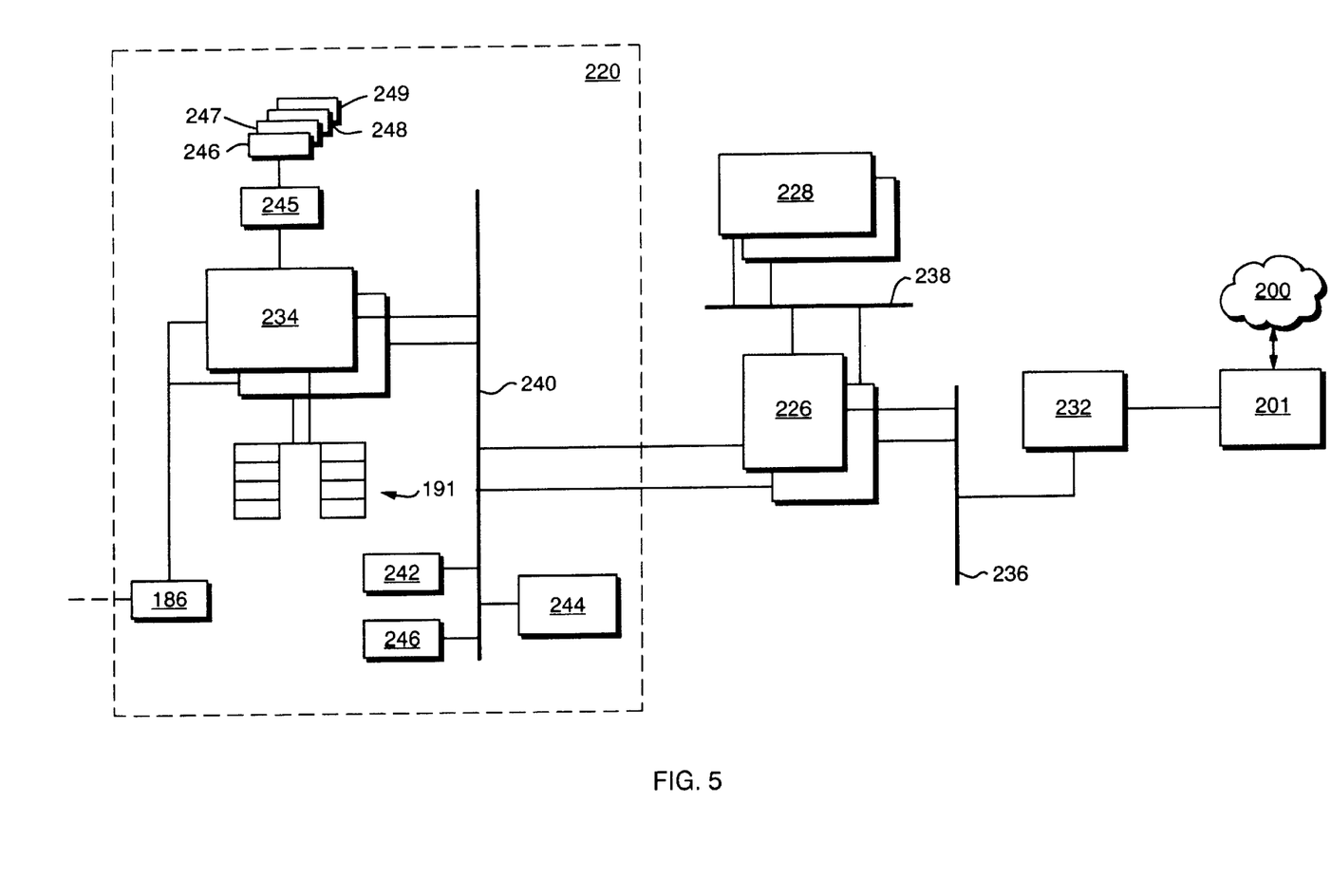
FIG. 5 is a hardware block diagram of the on-line portion of a preferred embodiment of the certificate authority facility of the invention.

FIG. 5 is a more detailed hardware diagram of a preferred embodiment of the portion of the CA facility 190 including on-line CA system 220. Requests arrive over the network 200, pass through a router 232 to the firewall system 226 and then to the web-server 228. If CA processing is required, the request is routed to the on-line CA applications server 234. Information is sent back to the requester via the firewall system 226, router 232 and the network 200.

One feature of this preferred embodiment is that the platforms used for the servers, router and firewall are designed so that additional capacity or devices can be added with little impact to the hardware and/or software in the on-line portion of CA facility 190. In this preferred embodiment, Sun workstations and software operating systems serve as the platforms for the on-line CA server 234, the operator station 242, the security station 244, the web-server 228, the firewall system 226 and the system administrator stations 246. The Sun systems allow for expansion with minimal software change, generally using the Solaris 2.4 Desktop operating system. In the preferred embodiment, access to each of the systems is controlled by a SecurID card from Securities Dynamics.

The router 232 is, preferably, a CISCO model 2514-type router providing a dedicated, high speed connection from firewall system 226 to T1/T3 lines to a network service provider 201 and, then, to the Internet 200. In the preferred embodiment, web-server 228, accommodating all Internet traffic with applications server 234, is based redundantly on two identically configured dual processor Sun SPARCservers 20/152MP running the Solaris 2.4 and Secure Web Server software from Open Market.

Referring to FIG. 5, the firewall system 226 supports on-line CA system 220 over three Ethernets for which it is common node or hub, using techniques known in the art: (1) Ethernet 236 on which router 232 is a node, (2) Ethernet 238 on which web-server 228 is a node, and (3) Ethernet 240 on which on-line CA applications server 234 is a node. The hardware and software run the firewall system 226 with special software that is installed to provide the protection from failures external to the CA on-line system as well as unauthorized access. In the preferred embodiment, firewall system 226 is based redundantly on a pair of identically configured Sun SPARCserver 5 Model 110s with a multiport Ethernet adapter, running FireWall-1 from Checkpoint.

Still referring to FIG. 5, on the applications server Ethernet 240 there is a secure operator station interface 242 to the CA facility 190, a Sun SPARCstation 5 in the preferred embodiment. It is from this station that facility operators perform their functions of data entry, approvals and other administrative tasks. Access to the secure operator station requires the use of a personalized Spyrus crypto card. Physical access to CA facility 190 is controlled and may include two persons being present before allowing an operator into the physical facility and when an operator logs in. Other such security methods may be used as are known in the art.

Also on the applications server Ethernet 240 is the security server 244, in the preferred embodiment, a Sun SPARCstation 5 Model 110. In the preferred embodiment, the security server 244 is the host for the SecurID access, the host for the firewall management control software (and thus screens access from the network), and is the status center for the CA facility 190. Access to this system requires the Spyrus crypto card.

A system administrator station 246 on applications server Ethernet 240 allows monitoring of the system, duplicating some of the monitoring capabilities of operator station 242 with, in the preferred embodiment, a Sun SPARCstation 5 Model 110. Access to this station requires the Spyrus crypto card. This station is designed for monitoring and cannot perform any system changes or remote operations as can the operator station 242.

The redundant on-line CA server 234, a node on Ethernet 240, is based, in the preferred embodiment, on a Sun SPARCserver 20/152 running Solaris 2.4 Server operating system, with 11-user Oracle 7 database management software. Access to the server requires the Spyrus crypto card. A 20-gigabyte Ultimate 5 series RAID array 191 is provided for redundant storage of the on-line CA database (CRDs and certificates) and the network file system.

In the preferred embodiment, all encryption functions (key pair generation, private key storage, encryption/decryption) at the on-line CA 220 are performed using SPYRUS EES LYNKS cards from Spyrus Systems. These cards are tamper-resistant and made to U.S. Government and commercial digital signature and encryption algorithm standards, e.g., FIPS 140-1 Level 2. In other embodiments, other such crypto cards may be used.

As shown in FIGS. 3 and 5, crypto cards 246–249 connect to the on-line CA system processor 234 via a SCSI-2 bus and card reader 245. The crypto cards are locked in their chassis while in operation and in safes when not used. In the preferred embodiment, two-person access control is used at all times for physical access to these cards. Physical access to the facility is controlled by combination lock, biometric devices, and two-person mechanisms.

Figure 6:
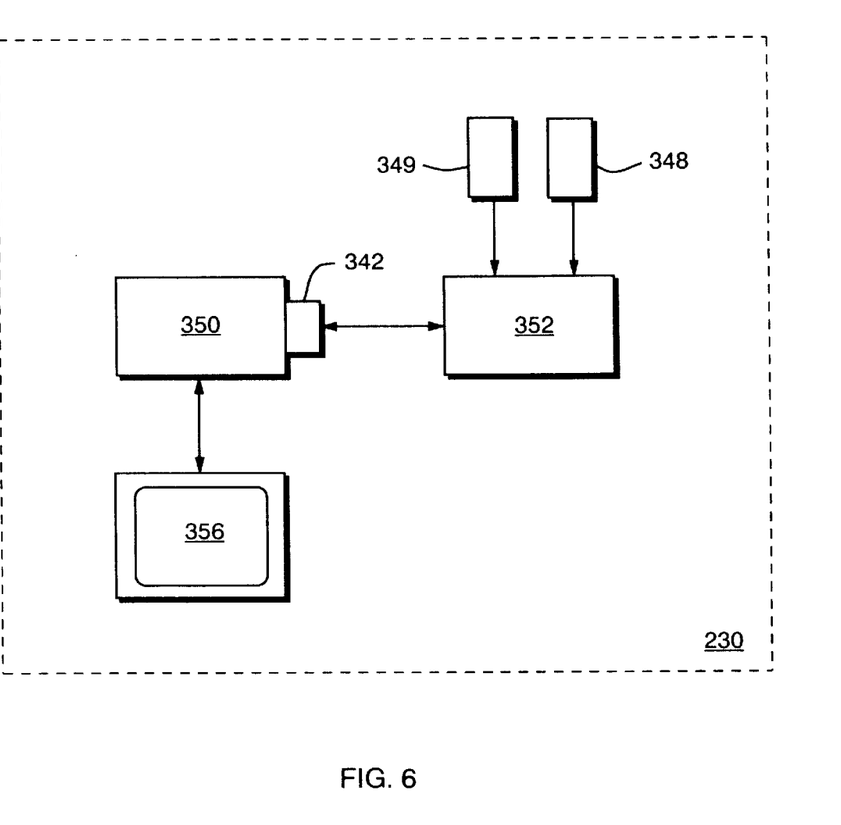
FIG. 6 is a hardware block diagram of the off-line portion of a preferred embodiment of the certificate authority facility of the invention.

FIG. 6 shows the off-line root CA 230 of FIG. 3. The off-line root CA 230 is a high security stand alone system that generates its own keys for encryption/decryption, signs certificates for lower-level CAs such as on-line CA 220 in CA facility 190, and generates and maintains certificate revocations lists.

In the preferred embodiment, the off-line root CA 230 includes a processor 350 with dual card readers 352 connected up via a SCSI bus 342. One slot is for the off-line CA's crypto card 348 and the other for a crypto card 349 to be used in the on-line CA 220. There is an operator's console 356 and interface such as a terminal having a CRT and keyboard, by which the human operator can enter registration, revocation and request information into the off-line root CA 230.

As part of the operations of CA 190 of the preferred embodiment, the off-line 230 CA 230 creates its own RSA public/private key pair and signs a certificate using function calls to its crypto card 248, adds its own self-signed certificate including the off-line public key and writes that certificate and its public key onto the on-line CA crypto card 249 which is inserted into card reader 352 in the off-line root CA system 230. The on-line crypto card 249 is commanded to generate its own private/public key pair. (In this process, the operator can input revocation lists for the on-line crypto cards for which the off-line CA signed certificates.) The completed, certified on-line CA crypto card 348 and an associated PIN are physically unplugged and physically delivered to the on-line CA system 220.

The off-line root CA 230 is isolated and is not connected to any other input/output except through the card reader 352 and the operator's console 356. The off-line root CA 230 is not accessible electronically by any other system. There is tight physical control of the off-line root CA 230, including access requiring the presence of two people. Moreover, when not in use, the off-line root CA 230 is powered down and its crypto card 248 is stored in a safe again requiring added security of two people for access. Other security methods as known in the art may be used to ensure the security of the off-line crypto card 248.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for certifying a transaction comprising:

an interface to a network, said network interface comprising a firewall system;

a storage device;

an application processor adapted for accepting from said network interface a request for issuance of a certificate, for writing said certificate issuance request to said storage device, for accepting from said network interface a request for access to said certificate issuance request written on said storage device, for reading said certificate issuance request from said storage device, for communicating to said network interface for transmission to the source of said request for access to said certificate issuance request, for accepting from said network interface an approval of said certificate issuance request, for directing the generation of a certificate in accordance with said certificate issuance request and said approval, and for communicating to said network interface for transmission to the source of said certificate issuance request said generated certificate;

a web server processor connected, along with said application processor, to said firewall system;

each processor being a redundant pair of processors; and said storage device comprising portions to which data is written redundantly and independently.

2. Apparatus for certifying a transaction comprising:

an interface to a network;

a storage device;

an application processor adapted for accepting from said network interface a request for issuance of a certificate, for writing said certificate issuance request to said storage device, for accepting from said network interface a request for access to said certificate issuance request written on said storage device, for reading said certificate issuance request from said storage device, for communicating to said network interface for transmission to the source of said request for access to said certificate issuance request, for accepting from said network interface an approval of said certificate issuance request, for directing the generation of a certificate in accordance with said certificate issuance request and said approval, and for communicating to said network interface for transmission to the source of said certificate issuance request said generated certificate; and a standalone processor, electrically isolated from said network interface and said application processor, for generating a higher-level certificate for said apparatus.

3. Apparatus for certifying a transaction comprising:

an interface to a network;

a storage device;

an application processor adapted for accepting from said network interface a request for issuance of a certificate, for writing said certificate issuance request to said storage device, for accepting from said network interface a request for access to said certificate issuance request written on said storage device, for reading said certificate issuance request from said storage device, for communicating to said network interface for transmission to the source of said request for access to said certificate issuance request, for accepting from said network interface an approval of said certificate issuance request, for directing the generation of a certificate in accordance with said certificate issuance request and said approval, and for communicating to said network interface for transmission to the source of said certificate issuance request said generated certificate;

a standalone processor, electrically isolated from said network interface and said application processor, for generating a higher-level certificate for said apparatus;

a first cryptographic card reader communicating with said application processor for generation of said requested certificate using a secure cryptographic card; and a second cryptographic card reader communicating with said standalone processor for generating said higher-level certificate using said secure cryptographic card.

4. Apparatus for issuing a plurality of types of certificates for a transaction comprising:

an interface to a network;

a storage device;

a plurality of cryptographic processors each associated with a type of certificate;

an application processor adapted for accepting from said network interface a request for issuance of a type of certificate, for writing said certificate issuance request to said storage device, for accepting from said network interface a request associated with said type of certificate for access to said certificate issuance request written on said storage device, for reading said certificate issuance request form said storage device, for communicating to said network interface for transmission to the source of said request for access to said certificate issuance request, for accepting from said network interface an approval of said certificate issuance request, for directing the cryptographic processor associated with said type of certificate to generate a certificate in accordance with said certificate issuance request and said approval, and for communicating to said network interface for transmission to the source of said certificate issuance request said generated certificate;

each processor being a redundant pair of processors; and said storage device comprising portions to which data is written redundantly and independently.

5. Apparatus for issuing a plurality of types of certificates for a transaction comprising:

an interface to a network;

a storage device;

a plurality of cryptographic processors each associated with a type of certificate;

an application processor adapted for accepting from said network interface a request for issuance of a type of certificate, for writing said certificate issuance request to said storage device, for accepting from said network interface a request associated with said type of certificate for access to said certificate issuance request written on said storage device, for reading said certificate issuance request form said storage device, for communicating to said network interface for transmission to the source of said request for access to said certificate issuance request, for accepting from said network interface an approval of said certificate issuance request, for directing the cryptographic processor associated with said type of certificate to generate a certificate in accordance with said certificate issuance request and said approval, and for communicating to said network interface for transmission to the source of said certificate issuance request said generated certificate;

each processors being a redundant pair of processors;

said storage device comprising portions to which data is written redundantly and independently; and a standalone processor, electrically isolated from said network interface and said application processor, for generating higher-level certificates for said plurality of types of certificates.

6. Apparatus for issuing a plurality of types of certificates for a transaction comprising:

an interface to a network;

a storage device;

a plurality of cryptographic processors each associated with a type of certificate;

an application processor adapted for accepting from said network interface a request for issuance of a type of certificate, for writing said certificate issuance request to said storage device, for accepting from said network interface a request associated with said type of certificate for access to said certificate issuance request written on said storage device, for reading said certificate issuance request form said storage device, for communicating to said network interface for transmission to the source of said request for access to said certificate issuance request, for accepting from said network interface an approval of said certificate issuance request, for directing the cryptographic processor associated with said type of certificate to generate a certificate in accordance with said certificate issuance request and said approval, and for communicating to said network interface for transmission to the source of said certificate issuance request said generated certificate;

each processor being a redundant pair of processors;

said storage device comprising portions to which data is written redundantly and independently;

a standalone processor, electrically isolated from said network interface and said application processor, for generating higher-level certificates for said plurality of types of certificates;

said plurality of cryptographic processors comprising a first cryptographic card reader communicating with said application processor for generation of said requested certificate using a corresponding plurality of secure cryptographic cards; and a second cryptographic card reader communicating with said standalone processor for generating said higher-level certificates using said corresponding plurality of secure cryptographic cards.

* * * * *